United States Patent
Laux et al.

(12)

(10) Patent No.: US 7,421,248 B1
(45) Date of Patent: Sep. 2, 2008

(54) METHOD AND APPARATUS FOR ADJUSTING OPERATIONAL PARAMETER OF A WIRELESS DEVICE BASES UPON A MONITORED CHARACTERISTIC

(75) Inventors: Carlos V. Laux, San Ramon, CA (US); Kamaldip Toor, San Diego, CA (US); Marcio G. de Siqueira, San Jose, CA (US); Sudhakar S. Valluru, San Jose, CA (US); Steven Hayashi, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1101 days.

(21) Appl. No.: 10/293,396

(22) Filed: Nov. 12, 2002

(51) Int. Cl.
*H04Q 7/20* (2006.01)
*H04B 17/00* (2006.01)

(52) U.S. Cl. .................... 455/67.11; 455/445; 370/352; 379/265.06

(58) Field of Classification Search ................. 370/332, 370/352; 455/67.11, 445; 379/265.06
See application file for complete search history.

(56) References Cited

U.S. PATENT DOCUMENTS

| 6,269,086 B1 | 7/2001 | Magana et al. ............... 370/280 |
| 6,330,244 B1 | 12/2001 | Swartz et al. ................ 370/401 |
| 6,370,381 B1 * | 4/2002 | Minnick et al. .............. 455/445 |
| 6,967,946 B1 * | 11/2005 | Tackin et al. ................ 370/352 |
| 6,996,374 B1 * | 2/2006 | Bao et al. ................. 455/67.11 |
| 2008/0063178 A1 * | 3/2008 | Paden et al. ............ 379/265.06 |

* cited by examiner

*Primary Examiner*—William D Cumming
(74) *Attorney, Agent, or Firm*—Baker Botts L.L.P.

(57) ABSTRACT

A method includes establishing a communication session at a wireless device and monitoring at least one characteristic associated with the communication session. The method also includes adjusting at least one operational parameter of the wireless device based on the at least one monitored characteristic.

25 Claims, 7 Drawing Sheets

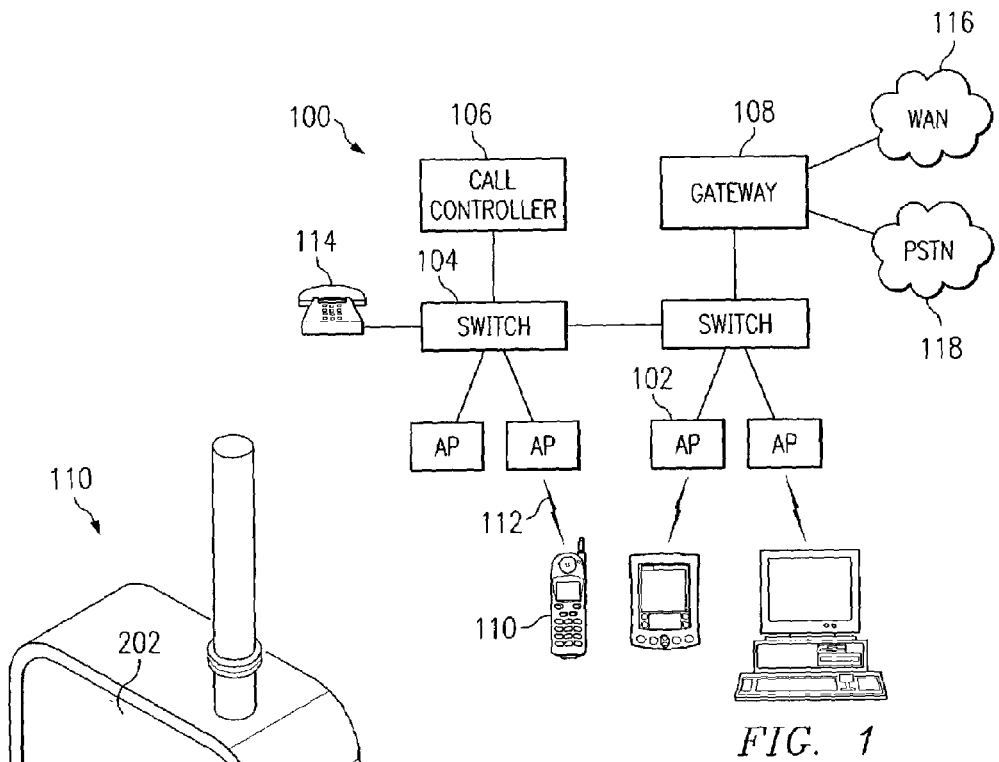
FIG. 1
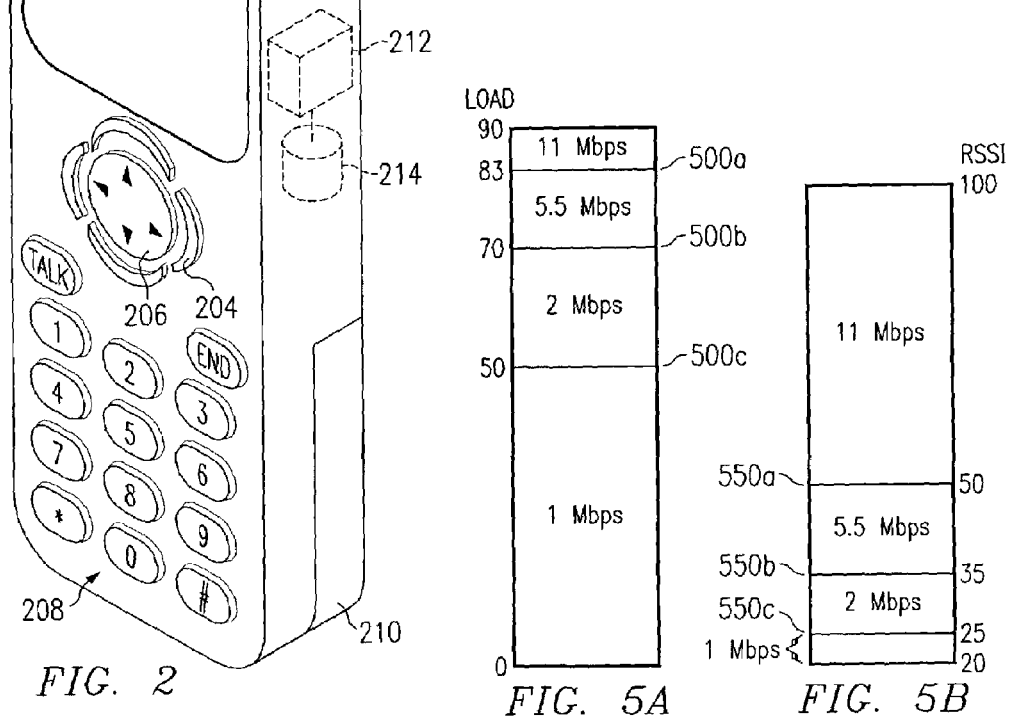
FIG. 2
FIG. 5A
FIG. 5B

600
| LOAD | | RSSI | | TRANSMISSION RATE |
|---|---|---|---|---|
| MINIMUM | MAXIMUM | MINIMUM | MAXIMUM | |
| $L_1$ | $L_2$ | $R_1$ | $R_2$ | 1 Mbps |
| $L_2$ | $L_3$ | $R_1$ | $R_3$ | 2 Mbps |
| $L_1$ | $L_4$ | $R_1$ | $R_4$ | 5.5 Mbps |
| $L_3$ | $L_5$ | $R_2$ | $R_4$ | 2 Mbps |
| $L_6$ | $L_7$ | $R_2$ | $R_5$ | 11 Mbps |
| 604 | | 606 | | 608 |
602
*FIG. 6*
| CHANNEL GROUPS | CHANNEL NUMBERS | SCAN FREQUENCY |
|---|---|---|
| VALID CHANNELS | 1, 6, 8 | 2 SEC |
| POTENTIAL CHANNELS | 7, 9, 10 | 20 SEC |
| OVERLAP CHANNELS | 2, 3, 4, 5 | 60 SEC |
| INCOMPATIBLE CHANNELS | 11 | 300 SEC |
702  704  706
*FIG. 7*
700
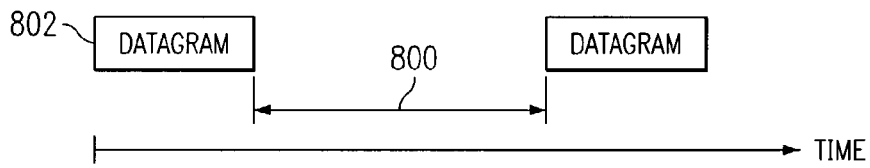
*FIG. 8A*
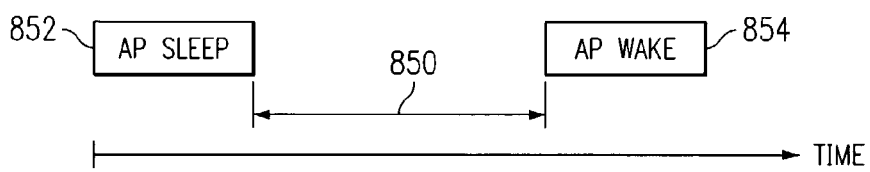
*FIG. 8B*

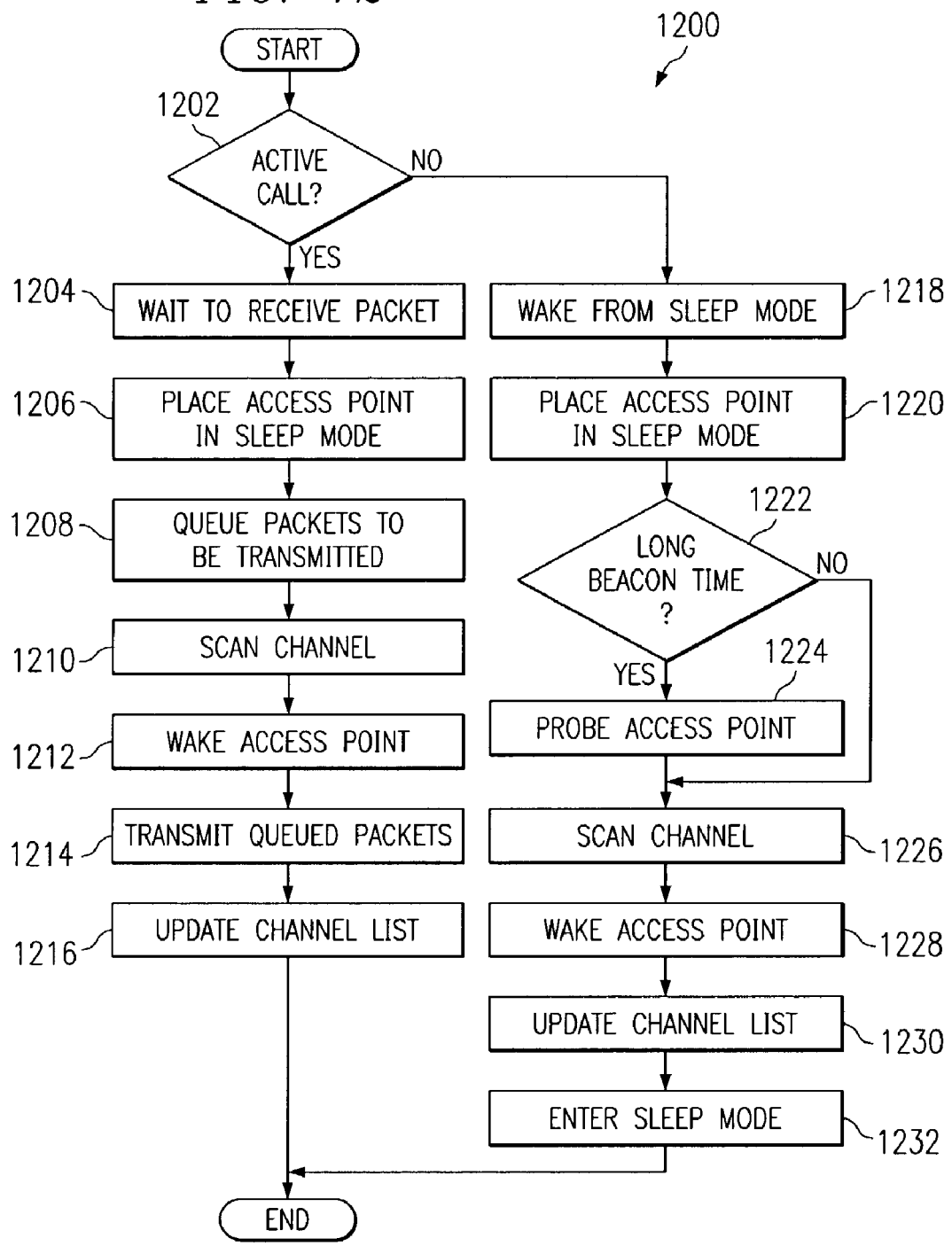

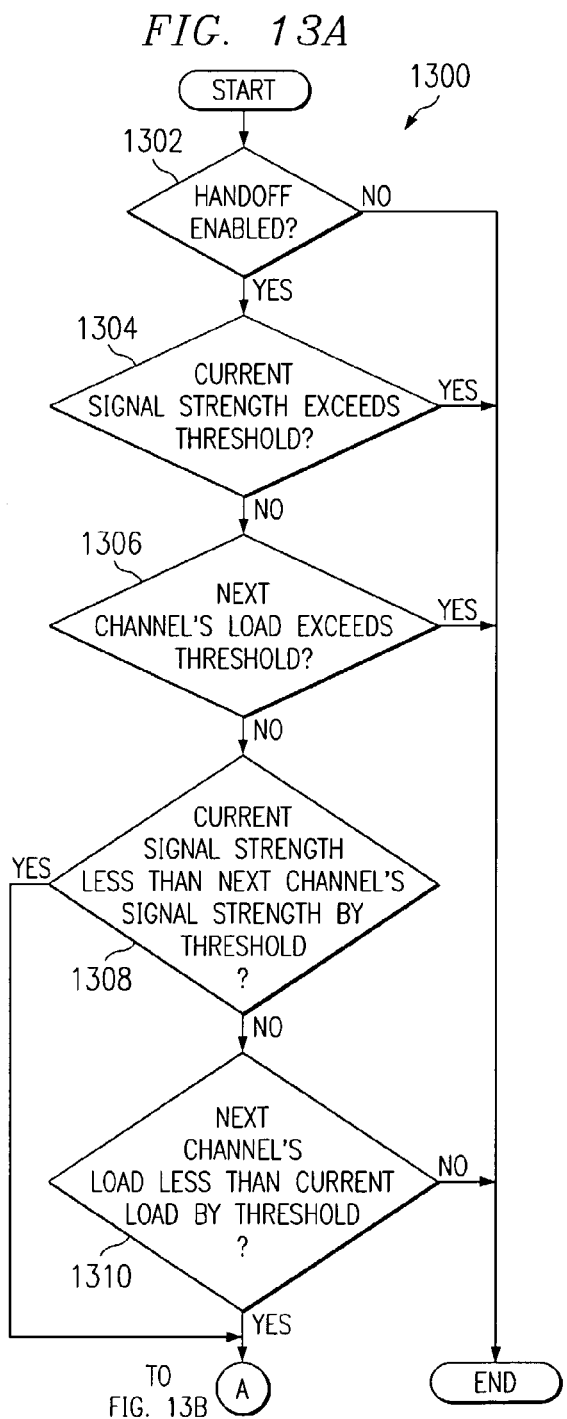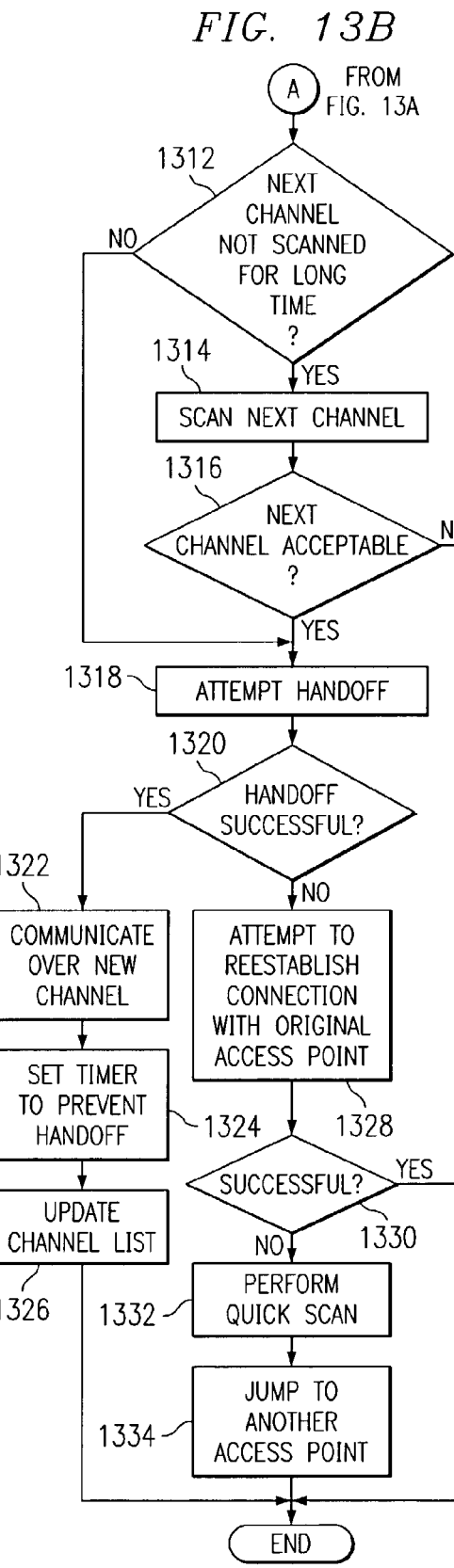

METHOD AND APPARATUS FOR ADJUSTING OPERATIONAL PARAMETER OF A WIRELESS DEVICE BASES UPON A MONITORED CHARACTERISTIC

TECHNICAL FIELD

This disclosure relates generally to communication systems, and more particularly to a method and apparatus for channel enhancement in a communication system.

BACKGROUND

A typical communication network allows wireless devices, such as mobile telephones, to communicate with the network. Each wireless device can typically participate in at least one communication session, such as a telephone call. Each wireless device can also usually roam from one area of the network to other areas of the network. During a communication session, the quality of the communication session may typically vary. For example, the wireless device may move away from the network component handling the session, and the distance may decrease the quality of the session. Also, the network component handling the session may also be handling a large number of additional communication sessions, which could affect the quality of the communication sessions.

SUMMARY

This disclosure describes a method and apparatus for channel enhancement in a communication system.

In one embodiment, a method includes establishing a communication session at a wireless device and monitoring at least one characteristic associated with the communication session. The method also includes adjusting at least one operational parameter of the wireless device based on the at least one monitored characteristic.

One or more technical advantages may be provided according to various embodiments of this disclosure. Particular embodiments of this disclosure may exhibit none, some, or all of the following advantages depending on the implementation. For example, in one embodiment, a wireless device may help to improve the quality of a communication session. In particular, the wireless device may monitor various characteristics associated with the communication session, such as by monitoring the strength of a signal received from an access point. When appropriate or necessary, the wireless device may adjust one or more of its operational parameters. As particular examples, the wireless device could alter its transmission rate and its transmission power. The quality of the communication session may be improved by allowing the wireless device to monitor the quality of the communication session and alter its operational parameters accordingly. This may also help to reduce the likelihood that the quality of the communication session will decrease to the point where the communication session is dropped or otherwise terminated prematurely.

Other technical advantages will be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which:

FIG. 1 illustrates an example communication system;
FIG. 2 illustrates an example wireless device;
FIGS. 5A and 5B illustrate example thresholds used by a wireless device to adjust its operational parameters;
FIG. 6 illustrates an example table used by a wireless device to adjust its operational parameters;
FIG. 7 illustrates an example table used by a wireless device to classify and scan communication channels;
FIGS. 8A and 8B illustrate example scanning periods when a wireless device scans a communication channel;
FIG. 12 illustrates an example method for scanning a particular communication channel;
and
FIGS. 13A and 13B illustrate an example method for performing a handoff to support user mobility in a communication system.

DETAILED DESCRIPTION OF EXAMPLE EMBODIMENTS

Figure 3:
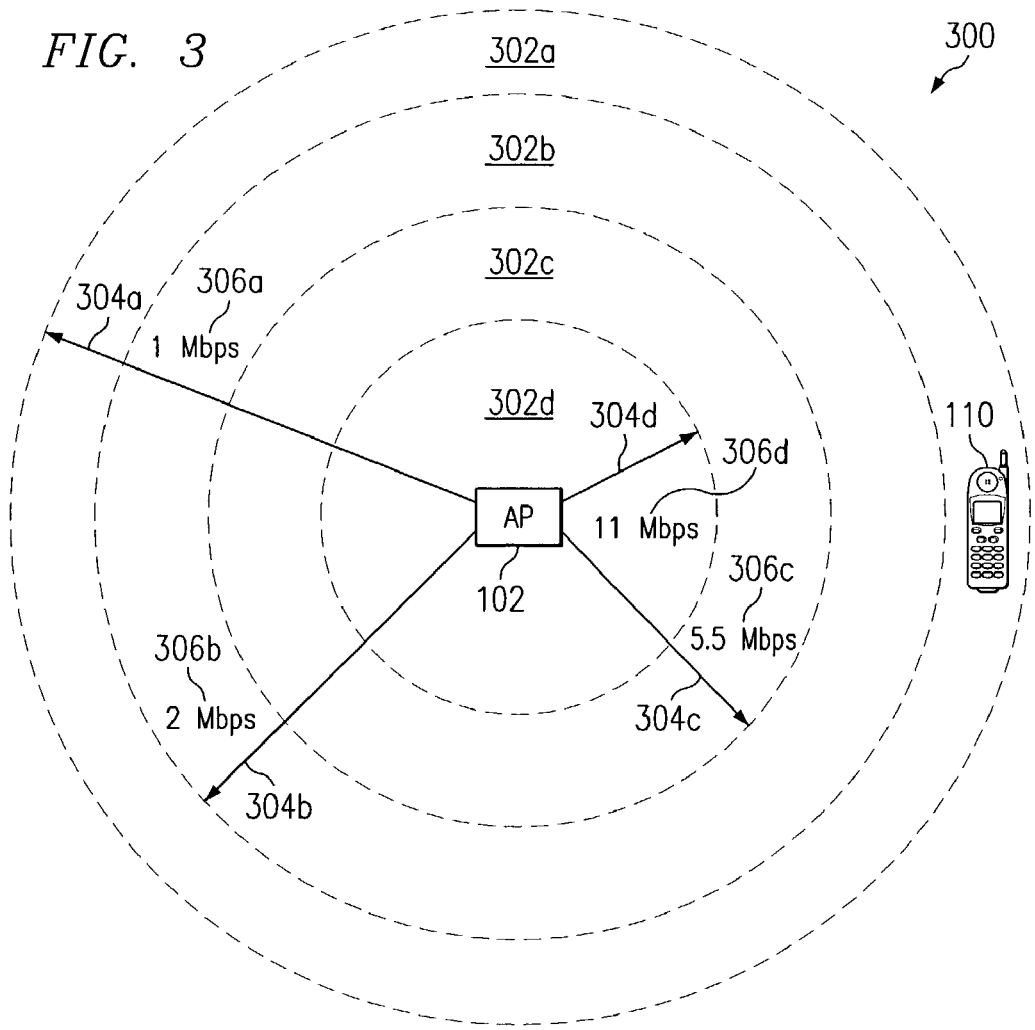
FIG. 3 illustrates an example coverage age associated with an access point.

FIG. 1 illustrates an example communication system 100. In the illustrated example, system 100 includes access points (APs) 102, switches 104, a call controller 106, and a gateway 108. Other embodiments of system 100 may be used without departing from the scope of this disclosure.

In one aspect of operation, each wireless device 110 may initiate or otherwise enter into a communication session involving an access point 102. Wireless device 110 may monitor various characteristics associated with the communication session, such as the strength of signals received from access point 102. Based on the monitored characteristics, wireless device 110 may adjust one or more of its operational parameters, such as by altering its transmission rate or transmission power. By allowing wireless device 110 to monitor the quality of the communication session and adjust its operational parameters, wireless device 110 may help to improve the quality of the communication session.

In another aspect of operation, the user of a wireless device 110 may move within system 100 and communicate through different access points 102. To support user mobility in system 100, wireless device 110 may scan multiple communication channels 112, classify the channels 112 into different categories, and perform additional scans of the communication channels 112. During the additional scans, the interval between scans of a particular channel 112 may depend, at least in part, on the category in which the particular channel 112 resides. This may allow the wireless device 110 to scan better quality communication channels more often than poorer quality channels.

In the illustrated embodiment, access point 102 is coupled to a switch 104. In this specification, the term "couple" refers to any direct or indirect communication between two or more components, whether or not those components are in physical contact. Access point 102 communicates with one or more wireless devices 110 over one or more communication channels 112. For example, access point 102 may establish a communication session for a wireless device 110. The communication session could include a voice telephone call, a facsimile or data transmission, or any other suitable communication session. In one embodiment, access point 102 communicates with wireless devices 110 using one or more Institute of Electrical and Electronics Engineers (IEEE) 802.11 protocols. As particular examples, access point 102 could communicate with a wireless device 110 using the 802.11a, 802.11b, or 802.11g protocols. Access point 102 may include any hardware, software, firmware, or combination thereof operable to communicate with one or more wireless devices 110.

Wireless device 110 communicates with access point 102 over a communication channel 112. A user using wireless device 110 may roam within system 100, and wireless device 110 may stop using one access point 102 and begin using another access point 102. Wireless device 110 may include any suitable hardware, software, firmware, or combination thereof for communicating with system 100. Wireless device 110 may, for example, include a mobile telephone, a computer, a personal digital assistant, or other device having a processor and a memory. In various portions of this specification, system 100 may be described as handling voice calls to and from wireless devices 110 that represent mobile telephones. System 100 could allow wireless devices 110 to transmit and receive other types of traffic, such as facsimile traffic and data traffic.

In the illustrated embodiment, each switch 104 is coupled to multiple access points 102 and to another switch 104. Each switch 104 is also coupled to additional components of system 100, such as to call controller 106, gateway 108, or a packet-switched telephone 114. Switch 104 facilitates communication between the various components of system 100. For example, switch 104 may allow an access point 102 to communicate with call controller 106. Switch 104 could also allow two access points 102 to communicate with one another and establish a communication session between two wireless devices 110. Switch 104 may include any hardware, software, firmware, or combination thereof for facilitating communication between components of system 100.

In the illustrated embodiment, call controller 106 is coupled to a switch 104. Call controller 106 facilitates the routing of information to and from wireless devices 110 in system 100. For example, call controller 106 may track the location of a wireless device 110 in system 100. Call controller 106 may then inform an access point 102, switch 104, or gateway 108 where to route an incoming telephone call or message for wireless device 110. This may allow, for example, the user of a wireless device 110 to move or roam within system 100 and still receive incoming calls or messages. The roaming may or may not occur while a communication session is established with the wireless device 110. Call controller 106 may include any hardware, software, firmware, or combination thereof for facilitating the routing of information to and from wireless devices 110 in system 100

In the illustrated embodiment, gateway 108 is coupled to a switch 104 and one or more external networks, such as a wide area network (WAN) 116 and a public switched telephone network (PSTN) 118. Gateway 108 transfers information between system 100 and the external networks. For example, gateway 108 may receive datagrams containing voice information from a wireless device 110, and gateway 108 may communicate the datagrams to the external network. A datagram may represent an Internet Protocol (IP) packet, a frame relay frame, an Asynchronous Transfer Mode (ATM) cell, or any other suitable segment of information. Gateway 108 may also perform a conversion function to translate information between various formats and protocols. As an example, gateway 108 may communicate with switch 104 using a packet-switched format and with PSTN 118 using a circuit-switched format. In this example, gateway 108 may convert information from switch 104 into a suitable circuit-switched format for communication to PSTN 118. Gateway 108 may also convert information received from PSTN 118 into a packet-switched format for communication to switch 104. Gateway 108 may include any hardware, software, firmware, or combination thereof for facilitating communication with one or more external networks.

In one aspect of operation, wireless device 110 may communicate with an access point 102 over a communication channel 112. The communication channel 112 may be used to establish a communication session, such as to establish an incoming or outgoing telephone call. The quality of the communication session may vary based on several factors. For example, the strength of signals received from an access point 102 may affect the quality of the communication session, and the signal strength may decrease as the distance between a wireless device 110 and an access point 102 increases. Also, an access point 102 may be in communication with and handling communication sessions for multiple wireless devices 110. The amount or percentage of a communication channel 112 used by an access point 102 to provide service to wireless devices 110 may be referred to as the load of the channel 112. The quality of a communication session may decrease as the load placed on channel 112 increases.

In one embodiment, a wireless device 110 may monitor various characteristics associated with a communication session. For example, wireless device 110 may monitor the strength of a signal received from access point 102 and the load placed on the channel 112. In a particular embodiment, wireless device 110 may receive a signal from access point 102 and generate a Received Signal Strength Indication (RSSI) value, which identifies the strength of the signal received from access point 102. Also, in a particular embodiment, access point 102 broadcasts a beacon that identifies the load placed on channel 112, and wireless device 110 receives the signal and identifies the load. The broadcast signal could, for example, include one or more Quality of service Basic Service Set (QBSS) signals or any other signals identifying the bandwidth load. The QBSS signal may or may not identify different types of load, such as by identifying the load placed on channel 112 by voice communications and identifying the load placed on channel 112 by data communications. The signal identifying the load may or may not be the same signal used by wireless device 110 to identify the signal strength. Other or additional characteristics could be monitored by wireless device 110. For example, the access point 102 could broadcast its transmission power and the strength of the wireless device's signal received at the access point 102, and wireless device 110 could receive and process that signal.

Based on the measured characteristics, wireless device 110 may adjust its operational parameters to try to increase the quality of communication channel 112. For example, a wireless device 110 may be able to communicate with access point 102 at different transmission rates and transmission powers, and wireless device 110 could alter these parameters to increase the quality of communication channel 112. As a particular example, wireless device 110 could lower its transmission rate when the strength of a signal received from an access point 102 decreases below a threshold. The decrease in signal strength could indicate that the wireless device 110 is at an increased distance from access point 102, and lower transmission rates may be more effective than higher rates when the distance between wireless device 110 and access point 102 increases. Wireless device 110 could also increase its transmission rate when the load placed on a channel 112 increases above a threshold. The increased load could indicate that many wireless devices 110 are communicating with access point 102 over the channel 112, and higher transmission rates may help to reduce the load placed on channel 112. Other or additional operational parameters could be adjusted by wireless device 110, such as when wireless device 110 selects a codec having a higher or lower bandwidth. By allowing one or more wireless devices 110 to adjust their operational parameters, wireless devices 110 may be able to receive better service in system 100.

In another aspect of operation, a wireless device 110 may support roaming in system 100. For example, wireless device 110 may stop communicating with one access point 102 and begin communicating with another access point 102. To support roaming in system 100, wireless device 110 may scan multiple communication channels 112. During a scan of a channel 112, wireless device 110 attempts to identify various information about the channel 112. As an example, wireless device 110 could identify the signal strength associated with the channel 112, the load on the channel 112, or any other or additional information. As described above, the signal strength can be determined by wireless device 110, and the load can be supplied to wireless device 110 in a beacon from an access point 102. Wireless device 110 may also be able to perform different types of scans of a communication channel 112. For example, wireless device 110 could perform an active scan of a channel 112 or a passive scan of a channel 112. During a passive scan of a channel 112, wireless device 110 detects the beacon from an access point 102 and uses the beacon to identify information about the channel 112. During an active scan, wireless device 110 probes an access point 102 by sending a message to access point 102. Access point 102 then communicates a signal over the communication channel 112, and wireless device 110 uses the signal to identify information about the channel 112.

Wireless device 110 may also classify the channels 112 into different categories. Example categories may include valid channels 112 that could be used by wireless device 110, potentially valid channels 112 that are currently out of range of wireless device 110, channels 112 that overlap with each other or with a valid channel, and incompatible channels 112 that cannot be used. A channel 112 could be incompatible because the access point 102 supporting the channel 112 uses a different Service Set Identifier (SSID) or a different authentication type than the wireless device 110. Example authentication types could include LEAP and OPEN authentication types. A channel 112 could be valid because the access point 102 supporting the channel 112 uses the same SSID and authentication type as the wireless device 110 and has an acceptable signal strength. A channel 112 could be potentially valid when it uses the same SSID and authentication type, does not overlap with another valid or potentially valid channel 112, and has an acceptable signal strength, but no response was received when wireless device 110 probed the channel 112.

After the channels 112 have been categorized, wireless device 110 can perform additional scans of channels 112. This may allow, for example, wireless device 110 to update information about the channels 112 as wireless device 110 moves in system 100. As a particular example, this may allow wireless device 110 to determine whether a potentially valid channel 112 is now in range of wireless device 110. In one embodiment, wireless device 110 performs the additional scans of the channels 112 based on the categorization of channels 112. For example, wireless device 110 could perform the additional scans more frequently for valid channels 112 and potentially valid channels 112 and less frequently for overlap channels 112 and incompatible channels 112. By scanning the channels 112 at different intervals, wireless device 110 may perform fewer scans while in operation.

At some point, wireless device 110 may want or need to communicate with another access point 102. For example, wireless device 110 may roam outside the range of its current access point 102, or the current access point 102 may suddenly lose power. In these or other cases, wireless device 110 may attempt to communicate over a different communication channel 112. In one embodiment, wireless device 110 uses the information about the channels 112 collected during the channel scans to select a new channel 112. As a particular example, wireless device 110 may determine if any valid channels 112 have been identified during the scans. If so, wireless device 110 may associate and authenticate itself with the access point 102 using one of the valid channels 112. If successful, the access point 102 that uses the valid channel 112 begins serving wireless device 110.

In one embodiment, wireless device 110 may scan the channels 112 differently depending on whether an active communication session has been established at wireless device 110. For example, during an active telephone call, wireless device 110 may be receiving datagrams containing voice information to be provided to a user. In this case, wireless device 110 could actively scan a channel 112 between the receipt of two datagrams, which may help to reduce any disruptions noticeable to the user. When no communication session has been established at a wireless device 110, the wireless device 110 may be in an idle or sleep mode to conserve power. In that case, wireless device 110 may scan a channel 112 by waking from idle mode, performing a passive scan to detect the beacon from an access point 102, update the information about the particular channel 112 being scanned, and return to idle mode.

Wireless device 110 has been described as performing both a channel enhancement function and a scanning/roaming function. Other embodiments of wireless device 110 could also be used. For example, wireless device 110 could support one of these functions without supporting the other function.

Although FIG. 1 illustrates one example of a communication system 100, various changes may be made to system 100. For example, system 100 may include any suitable number of access points 102, switches 104, call controllers 106, gateways 108, and wireless devices 110. Also, each switch 104 may be coupled to any suitable number of access points 102, and each access point 102 may serve any suitable number of wireless devices 110. Further, while gateway 108 is shown as providing access to a WAN 116 and a PSTN 118, gateway 108 could provide access to any other or additional external network or networks. In addition, while FIG. 1 illustrates one example operational environment in which a wireless device 110 can adjust its operational parameters to increase the quality of a communication session, wireless device 110 could function in other operational environments.

FIG. 2 illustrates an example wireless device 110. In the illustrated example, wireless device 110 includes visible components, such as a display 202, a navigation button 204, buttons 206, a keypad 208, and a power supply 210. Wireless device 110 also includes internal components, such as a processor 212 and a memory 214. Other embodiments of wireless device 110 could be used in system 100 without departing from the scope of this disclosure.

Display 202 represents any suitable interface for visually presenting information. For example, display 202 may include a liquid crystal display (LCD). Within display 202, wireless device 110 can display information to a user, such as caller identification information associated with an incoming telephone call or the number being dialed by the user. Display 202 may represent any suitable structure for displaying information.

Navigation button 204 permits a user to indicate up, down, right, and left movements. For example, wireless device 110 could display a menu in display 202, and navigation button 204 allows the user to navigate the menu and select an option in the menu. Buttons 206 could permit a user to navigate up, down, right, and left in a menu or other display. Buttons 206 could also represent other functions available to be invoked by the user. For example, buttons 206 could allow the user to activate a menu, exit a menu, or activate a web surfing application. Keypad 208 permits traditional numeric and special character entry by a user. Navigation button 204, buttons 206, and keypad 208 could include or otherwise represent any suitable structure or structures for that can be depressed or otherwise selected by a user.

This embodiment illustrates a particular configuration of a specific display 202 and input mechanisms 204-208 for interacting with a user. Other wireless devices 110 may include other or additional display mechanisms, input mechanisms, types of mechanisms, and configurations than are shown.

Power supply 210 supplies operating power to wireless device 110. Power supply 210 could represent any suitable source or sources of power for wireless device 110. Power supply 210 could, for example, include a lithium-ion or other battery, a solar cell, a fuel cell, or any other or additional source of power.

Processor 212 represents one or more processors, programmed logic devices, or other suitable processing equipment for managing the operation of wireless device 110. Memory 214 may store information used by processor 212, such as instructions executed by processor 212 and data processed by processor 212. Memory 214 may represent any suitable device or devices for storing information using any of a variety of data structures, arrangements, or compilations.

In one aspect of operation, processor 212 may monitor one or more characteristics associated with a communication session. For example, processor 212 may identify the load on a channel 112 used by wireless device 110 and the strength of a signal received from access point 102. Based on these measurements, processor 212 could adjust the operational parameters of wireless device 110. For example, processor 212 could increase or decrease the transmission rate or transmission power of wireless device 110.

In another aspect of operation, processor 212 may scan and classify different communication channels 112. Processor 212 may also update the status of the channels 112 by performing additional scans of the channels 112. The interval between scans of a particular channel 112 may vary depending on how processor 212 classifies the channel 112. If wireless device 110 needs to begin communicating with another access point 102, processor 212 may select another communication channel 212 and attempt to use that channel 112.

Although FIG. 2 illustrates one example of a wireless device 110, various changes may be made to wireless device 110. For example, FIG. 2 illustrates wireless device 110 as a wireless telephone. Other types of wireless devices, such as laptop computers and personal digital assistants, can be used. Also, other or additional buttons can be used in wireless device 110.

FIG. 3 illustrates an example coverage area 300 associated with an access point 102. In particular, FIG. 3 illustrates how the transmission rate 306 used by a wireless device 110 may vary within coverage area 300.

In the illustrated embodiment, coverage area 300 is divided into multiple overlapping zones 302. The zones 302 may overlap because smaller zones 302 reside within larger zones 302. For example, zones 302b-302d reside within zone 302a.

Each zone 302 is defined by the maximum effective distance 304 associated with one of the transmission rates 306 used by a wireless device 110. In general, higher transmission rates 306 have shorter effective distances, so higher transmission rates 306 are used in zones 302 that are closer to access point 102. Similarly, lower transmission rates 306 have longer effective distances, so lower transmission rates 306 may be used in zones 302 that are farther away from access point 102.

In one embodiment, the distances 304 associated with an access point 102 may vary based on the operational environment of the access point 102. For example, distances 304 may vary depending on whether access point 102 is used indoors or outdoors. As a particular example, when used outdoors, distance 304a could represent a distance of 2,000 feet, and distance 304d could represent a distance of 800 feet. When used indoors, distance 304a could represent a distance of 350 feet, and distance 304d could represent a distance of 130 feet.

In one aspect of operation, the strength of a signal from access point 102 may vary depending on the location of a wireless device 110 within coverage area 300. In general, the signal strength may decrease as the distance from access point 102 increases. Wireless device 110 may monitor the signal strength and adjust its operational parameters based on the results. For example, if wireless device 110 roams out of zones 302b-302d while remaining in zone 302a, the signal strength may decrease below a threshold. Because of the low signal strength, wireless device 110 may decrease its transmission rate to 1 megabits per second. The lower transmission rate may allow wireless device 110 to effectively communicate with access point 102, despite the large distance between wireless device 110 and access point 102. Wireless device 110 could also use the strength of the signal from access point 102 to determine whether to initiate a handoff and communicate with another access point 102. For example, when wireless device 110 nears the outer edge of coverage area 300, wireless device 110 may be unable to maintain a suitable connection with access point 102, and wireless device 110 may look for another access point 102.

Although FIG. 3 illustrates one example of a coverage area 300 of access point 102, various changes may be made to FIG. 3. For example, any suitable number of zones 302 and transmission rates 306 could be used by wireless device 110 and supported by access point 102. Also, the boundaries between two zones 302 may not be precise. Further, the relationships between transmission rates 306 and distances 304 are for illustration only. In addition, the transmission rates 306 shown in FIG. 3 represent transmission rates used by an access point 102 implementing the 802.11b standard. Other access points implementing other standards and using other transmission rates could be used.

Figure 4:
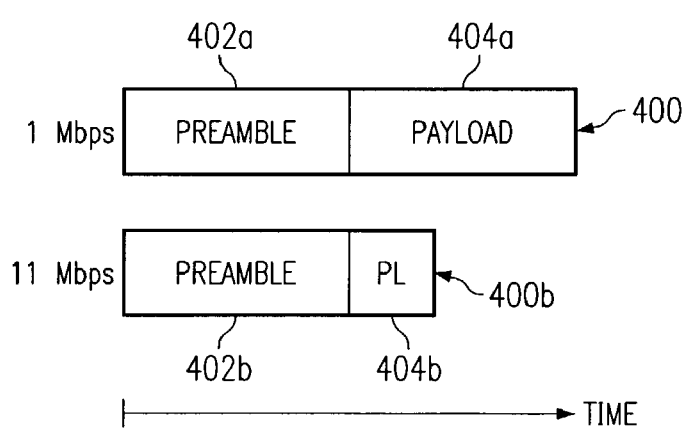
FIG. 4 illustrates example datagrams communicated over a communication channel.

FIG. 4 illustrates example datagrams 400 communicated over a communication channel. In particular, FIG. 4 illustrates the structure of two datagrams 400a and 400b and the relative amount of time needed to transmit datagrams 400 using different transmission rates. Datagrams 400 may, for example, be transmitted between a wireless device 110 and an access point 102 over a channel 112.

In the illustrated embodiment, each datagram 400 includes a preamble 402 and a payload 404. Preamble 402 contains information used by wireless device 110 or access point 102 to process a datagram 400. For example, preamble 402 may include synchronization bits and a start frame delimiter. This information may be used by wireless device 110 or access point 102 to identify the beginning of a datagram 400. Preamble 402 may also identify the length of the payload 404 in datagram 400. Preamble 402 may further identify the transmission rate used to transmit the payload 404 of datagram 400. In addition, preamble 402 may include error checking information used to verify proper receipt of a datagram 400.

Payload 404 contains voice, facsimile, data, or other traffic generated by or being delivered to a wireless device 110. For example, wireless device 110 could be involved in a telephone call, and payload 404 may contain a portion of a voice signal digitized by wireless device 110. As a particular example, payload 404 may include one or more frames of voice information, where each frame represents a specific window of time when voice information was collected. Payload 404 may have a fixed size or a variable size.

In FIG. 4, the relative sizes of payloads 404*a* and 404*b* are different. In this example, payloads 404*a* and 404*b* represent the same quantity of data, but payloads 404*a* and 404*b* are transmitted at different transmission rates. In particular, payload 404*a* is transmitted at 1 megabits per second, while payload 404*b* is transmitted at 11 megabits per second. As a result, it takes less time to transmit payload 404*b* than to transmit payload 404*a*.

As shown in FIG. 4, preambles 402*a* and 402*b* have the same size. As with payloads 404*a* and 404*b*, preambles 402*a* and 402*b* represent the same quantity of data. Unlike payloads 404*a* and 404*b*, it takes the same amount of time to transmit preambles 402*a* and 402*b*. In one embodiment, a preamble 402 is communicated at a single transmission rate, even when a different transmission rate is used to communicate a payload 404. In a particular embodiment, the preamble 402 of a datagram 400 is transmitted at a rate of 1 megabits per second.

The different lengths of time needed to transmit payloads 404 may be used to improve the quality of a communication session. For example, increasing the transmission rate decreases the time needed to transmit payload 404. This may help to decrease the load placed on a channel 112. This ability to lessen the load placed on channel 112 by increasing the transmission rate may depend, at least in part, on the distance between the access point 102 and the wireless device 110. As shown in FIG. 3, higher transmission rates may be difficult to use at larger distances from access point 102. As a result, increasing the transmission rate may help to decrease the load placed on channel 112, but this option may be limited based on the distance from access point 102.

In a particular embodiment, a wireless device 110 involved in a telephone call may generate a datagram 400 during each window of time the call is active. For example, wireless device 110 could generate a datagram 400 every 20 milliseconds or every 80 milliseconds. The amount of information carried in payload 404 may vary depending on this amount of time. As a example, a datagram 400 generated every 20 milliseconds may contain less information than a datagram 400 generated every 80 milliseconds.

Because the amount of information carried in payload 404 may vary in this way, the usefulness of adjusting the transmission rate may also vary. In the example in FIG. 4, adjusting the transmission rate alters the time needed to transmit payload 404 but not preamble 402. If the payload 404 of a datagram 400 is large, increasing the transmission rate may provide a noticeable benefit, such as by sizably decreasing the load on a channel 112. If the payload 404 of a datagram 400 is smaller, adjusting the transmission rate might provide a smaller benefit, such as by slightly decreasing the load on a channel 112. As a result, wireless device 110 may consider the size of payload 404 in deciding how to adjust its operational parameters. As a particular example, wireless device 110 may try to adjust its transmission rate sooner when the datagrams 400 are larger and later when the datagrams 400 are smaller.

To help lower the load imposed by wireless device 110, wireless device 110 could also reduce the number of datagrams 400 communicated to access point 102. For example, if wireless device 110 is configured to transmit a datagram 400 every 20 milliseconds, wireless device 110 could combine payloads 404 from two datagrams 400 into a single datagram 400 and communicate the datagram 400 after 40 milliseconds. In this way, wireless device 110 combines multiple voice frames into a single datagram 400, which helps to reduce the number of preambles 402 communicated over channel 112. This may help to reduce the percentage of the communication channel 112 used by wireless device 110.

Although FIG. 4 illustrates examples of datagrams 400 communicated over a communication channel, various changes may be made to FIG. 4. For example, other or additional fields could be contained in datagrams 400. Also, FIG. 4 illustrates preambles 402*a* and 402*b* as being transmitted at the same transmission rate even when different transmission rates are used to communicate payloads 404*a* and 404*b*. In another embodiment, preamble 402*a* may be communicated at a different transmission rate than preamble 402*b*.

FIGS. 5A and 5B illustrate example thresholds used by a wireless device to adjust its operational parameters. In particular, FIG. 5A illustrates example thresholds 500 used to adjust the transmission rate based on the load of a channel 112, and FIG. 5B illustrates example thresholds 550 used to adjust the transmission rate based on the strength of a signal received from access point 102.

In FIG. 5A, the transmission rate used by a wireless device 110 may vary depending on the load currently placed on a channel 112. Wireless device 110 may identify the load placed on channel 112 in any suitable manner. For example, access point 102 may broadcast a signal within its coverage area 300, and the signal may identify the load. Wireless device 110 may receive the signal, identify the load, and determine if and when the load crosses a threshold 500.

As shown in FIG. 5B, the transmission rate used by a wireless device 110 may also vary depending on the strength of the signal received from an access point 102. Wireless device 110 may identify the signal strength in any suitable manner. For example, wireless device 110 may receive a signal from access point 102 and measure the strength of the signal. Wireless device 110 may then, and determine if and when the measured signal strength crosses a threshold 550.

In one aspect of operation, wireless device 110 may use both the thresholds 500, 550 in FIGS. 5A and 5B to adjust its transmission rate. For example, wireless device 110 may determine that it should increase its transmission rate based on the load of channel 112. Wireless device 110 may also determine that the signal strength is too weak to support the increased transmission rate. Based on this determination, wireless device 110 may attempt to increase the quality of the communication channel 112 in other ways.

The thresholds illustrated in FIGS. 5A and 5B are for illustration only. In a particular embodiment, these thresholds as well as the thresholds described in the remainder of this specification could be established by the user, network operator, or any other suitable personnel. This may allow, for example, the operation of the wireless device 110 to be tuned to a particular environment and tested. In this embodiment, an interface can be provided in wireless device 110 allowing adjustment of the thresholds, such as an interface displayed to the user through display 202.

Although FIGS. 5A and 5B illustrate example thresholds used by a wireless device to adjust its operational parameters, various changes may be made to FIGS. 5A and 5B. For example, other transmission rates could be used by access point 102 and wireless device 110. Also, other suitable thresholds can be used by wireless device 110. Further, wireless device 110 could use mechanisms other than thresholds 500, 550 to adjust its operational parameters. In addition, wireless device 110 could adjust its operational parameters based on characteristics other than or in addition to load and signal strength.

FIG. 6 illustrates an example table 600 used by a wireless device to adjust its operational parameters. In the illustrated example, table 600 includes entries 602. Each entry 602 includes a load range 604, a signal strength range 606, and a transmission rate 608. Load range 604 identifies a range of values associated with the load placed on a channel 112. Signal strength range 606 identifies a range of values associated with the strength of a signal received from access point 102 by wireless device 110.

The load ranges 604 and the signal strength ranges 606 each represents two thresholds, a minimum threshold and a maximum threshold. In one embodiment, wireless device 110 may identify the load placed on channel 112 and the strength of a signal received from access point 102. Using the actual measurements, wireless device 110 could select a transmission rate 608. For example, wireless device 110 could examine entries 602 and determine which entry or entries 602 have load ranges 604 that include the identified load. Of those entries 602, wireless device 110 could determine which one has a signal strength range 606 that includes the measured signal strength. Wireless device 110 could then use the transmission rate 608 in the selected entry 602.

Specific values for the load range 604 and signal strength range 606 can be selected to provide any desired functionality in wireless device 110. For example, table 600 could be customized for a particular environment, and default values could be included in wireless device 110.

Although FIG. 6 illustrates one example of a table 600 used by a wireless device to adjust the operational parameters of the wireless device, various changes may be made to table 600. For example, other transmission rates could be used by access point 102 and wireless device 110. Also, any number of entries 602 could be used in table 600, and wireless device 110 could adjust its operational parameters based on other or additional characteristics. Further, a similar table could be used to adjust the transmission power used by wireless device 110.

FIG. 7 illustrates an example table 700 used by a wireless device to classify and scan communication channels 112. In the illustrated example, table 700 includes multiple channel groups 702. Each channel group 702 may be associated with zero or more channel numbers 704 and a scanning frequency 706.

Channel groups 702 identify the various groups in which a wireless device 110 can classify communication channels 112. In this example, channel groups 702 include valid channels 112, potentially valid channels 112, overlap channels 112, and incompatible channels 112. Other or additional categories could also be used by wireless device 110. Channel numbers 704 identify the channels 112 that have been assigned to each channel group 702. A particular channel group 702 could be associated with some, none, or all of the channel numbers 704, depending on the scans performed by wireless device 110. Scan frequencies 706 identify how often channels 112 in the different groups are scanned by wireless device 110. In this example, valid channels 112 are scanned every two seconds, while incompatible channels 112 are scanned every five minutes.

In one aspect of operation, wireless device 110 may generate table 700 after performing a "full scan", where wireless device 110 scans all available communication channels 112. In a particular embodiment, the full scan should take less than two seconds to complete. Wireless device 110 may then scan channels 112 according to the various scan frequencies 706 in table 700, and wireless device 110 may update table 700 as needed. For example, after roaming closer to the access point 102 that uses channel "10", wireless device 110 may determine that channel "10" is actually a valid channel 112. As another example, the access point 110 using channel "8" could lose power or suffer some other failure. In these or other cases, wireless device 110 could update table 700 to reflect the new status of the channels 112. After a specified amount of time elapses, wireless device 110 may perform another full scan and repeat this process. By repeating the full scan, wireless device 110 may be able to detect and scan additional channels 112, such as when wireless device 110 has moved since the last full scan.

When scanning a channel 112, wireless device 110 could identify the SSID, authentication type, signal strength, and load associated with that channel 112. Wireless device 110 could then process this information to determine how to classify the channel 112. For example, wireless device 110 could classify any channel 112 using a different SSID or authentication type as an incompatible channel 112. As another example, wireless device 110 could store previously measured values for the signal strength and load associated with the channel 112. When a new signal strength is measured, wireless device 110 could calculate a weighted average of the signal strength, where more recent measurements are given more weight. When a new load is determined, wireless device 110 could calculate the upper bound of the load values. Wireless device 110 could implement an aging mechanism to remove older signal strength values and load values from consideration after a certain length of time. Based on the weighted average of the signal strength and the upper load value, wireless device 110 can classify the channel 112. As a particular example, a specific channel 112 may have low load but extremely poor signal strength, which may indicate that wireless device 110 is out of range of the access point 102 using that channel 112. As a result, wireless device 110 could classify the channel 112 as a potential channel.

Although FIG. 7 illustrates one example of a table 700 used by a wireless device to classify and scan communication channels 112, various changes may be made to table 700. For example, the channels 112 listed in table 700 are for illustration only. Also, any suitable number of channel groups 702 could be used, and each channel group 702 can have any suitable scan frequency 706.

FIGS. 8A and 8B illustrate example scanning periods when a wireless device scans a communication channel 112. In particular, FIG. 8A illustrates a scanning period 800 occurring between the receipt of two datagrams 802, and FIG. 8B illustrates a scanning period 850 occurring when wireless device 110 places an access point 102 in sleep mode.

In FIG. 8A, wireless device 110 may be receiving datagrams 802 from an access point 102, such as during an active communication session. In this example, the time period between the receipt of two datagrams 802 is the scanning period 800. During this period 800, wireless device 110 may scan one or more channels 112 and update the table 700 based on the scanning results. By scanning a channel 112 between the receipt of two datagrams 802, disruptions that are noticeable by the user may be reduced or eliminated.

In FIG. 8B, wireless device 110 can place access point 102 in a sleep mode using a sleep command 852. This causes the access point 102 to stop transmitting information (if any) to wireless device 110, and access point 102 begins to queue any information for wireless device 110. At this point, wireless device 110 may scan one or more channels 112 and update the table 700 based on the results of the scanning. Once the scan is complete, wireless device 110 could wake the access point 102 using a wake command 854. This may cause access point 102 to transmit any queued information and any new information to wireless device 110.

In one embodiment, wireless device 110 receives a datagram 802 every twenty to eighty milliseconds. In this embodiment, when scanning period 800 is smaller, wireless device 110 may have less time to scan a channel 112. In a particular embodiment, wireless device 110 could be operable to scan a channel 112 using both techniques illustrated in FIGS. 8A and 8B. In this embodiment, when the time between datagrams 802 is larger, wireless device 110 could scan a channel 112 during period 800 between datagrams 802. When the time between datagrams 802 is smaller, wireless device 110 could scan a channel 112 during period 850 after placing the access point 102 in sleep mode.

Although FIGS. 8A and 8B illustrate examples of different scanning periods 800, 850 when a wireless device may scan a communication channel 112, various changes may be made to FIGS. 8A and 8B. For example, a wireless device 110 could be operable to scan a channel 112 only during period 800 or during period 850. Also, a wireless device 110 could be operable to scan a channel 112 at other times.

Figure 9:
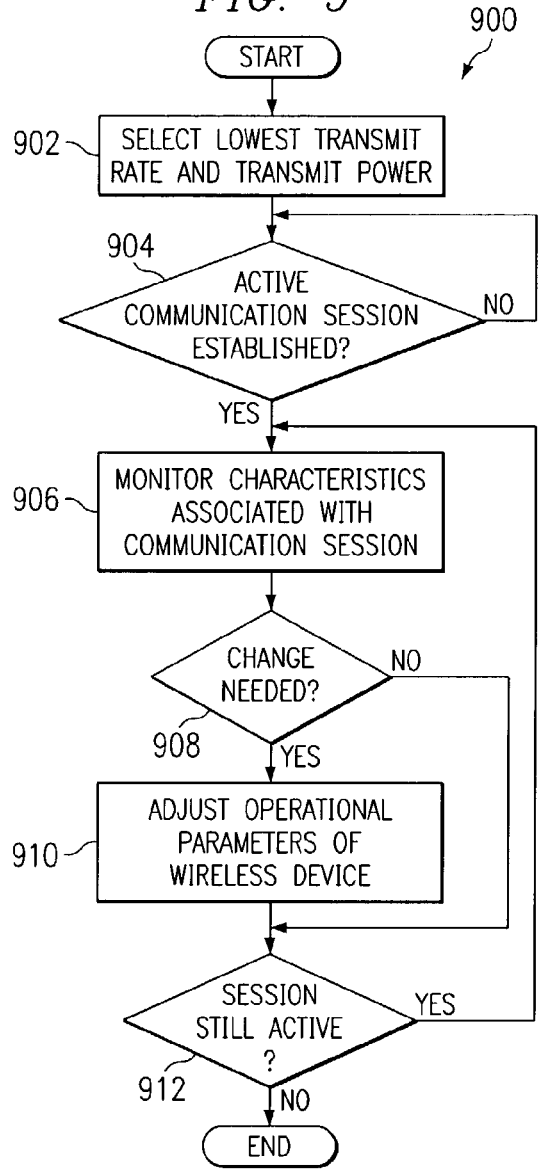
FIG. 9 illustrates an example method for channel enhancement in a communication system.

FIG. 9 illustrates an example method 900 for channel enhancement in a communication system. While method 900 may be described with respect to system 100 of FIG. 1, method 900 could also be used by other systems.

Wireless device 110 selects the lowest transmission rate and transmission power at step 902. This may include, for example, wireless device 110 selecting a 1 megabits per second transmission rate. Wireless device 110 determines whether an active communication session has been established at step 904. This may include, for example, wireless device 110 determining whether a communication session has been established over a communication channel 112.

If an active communication session has been established, wireless device 110 monitors one or more characteristics associated with the communication session at step 906. This may include, for example, wireless device 110 receiving a signal from access point 102 identifying the load placed on channel 112. This may also include wireless device 110 measuring the strength of a signal received from access point 102.

Wireless device 110 determines whether a change is needed to one or more operational parameters of wireless device 110 at step 908. This may include, for example, wireless device 110 determining whether the measured load and signal strength exceed or fall below the thresholds 500, 550 shown in FIGS. 5A and 5B. This may also include wireless device 110 using table 600 shown in FIG. 6. This may further include wireless device 110 detecting a threshold number of transmission or reception errors occurring over the currently-used channel 112. If a change to one or more of the operation parameters is needed, wireless device 110 adjusts the operational parameters at step 910. This may include, for example, wireless device 110 increasing or decreasing its transmission rate or its transmission power.

Wireless device 110 determines whether the communication session is still active at step 912. If so, wireless device 110 returns to step 906 to monitor the characteristics of the communication session. Otherwise, method 900 ends.

Although FIG. 9 illustrates one example of a method 900 for channel enhancement in a communication system, various changes may be made to method 900. For example, wireless device 110 could select other initial transmission rates and transmission powers at step 902. Also, wireless devices 110 could use other techniques for identifying when a change is needed to its operational parameters.

Figure 10:
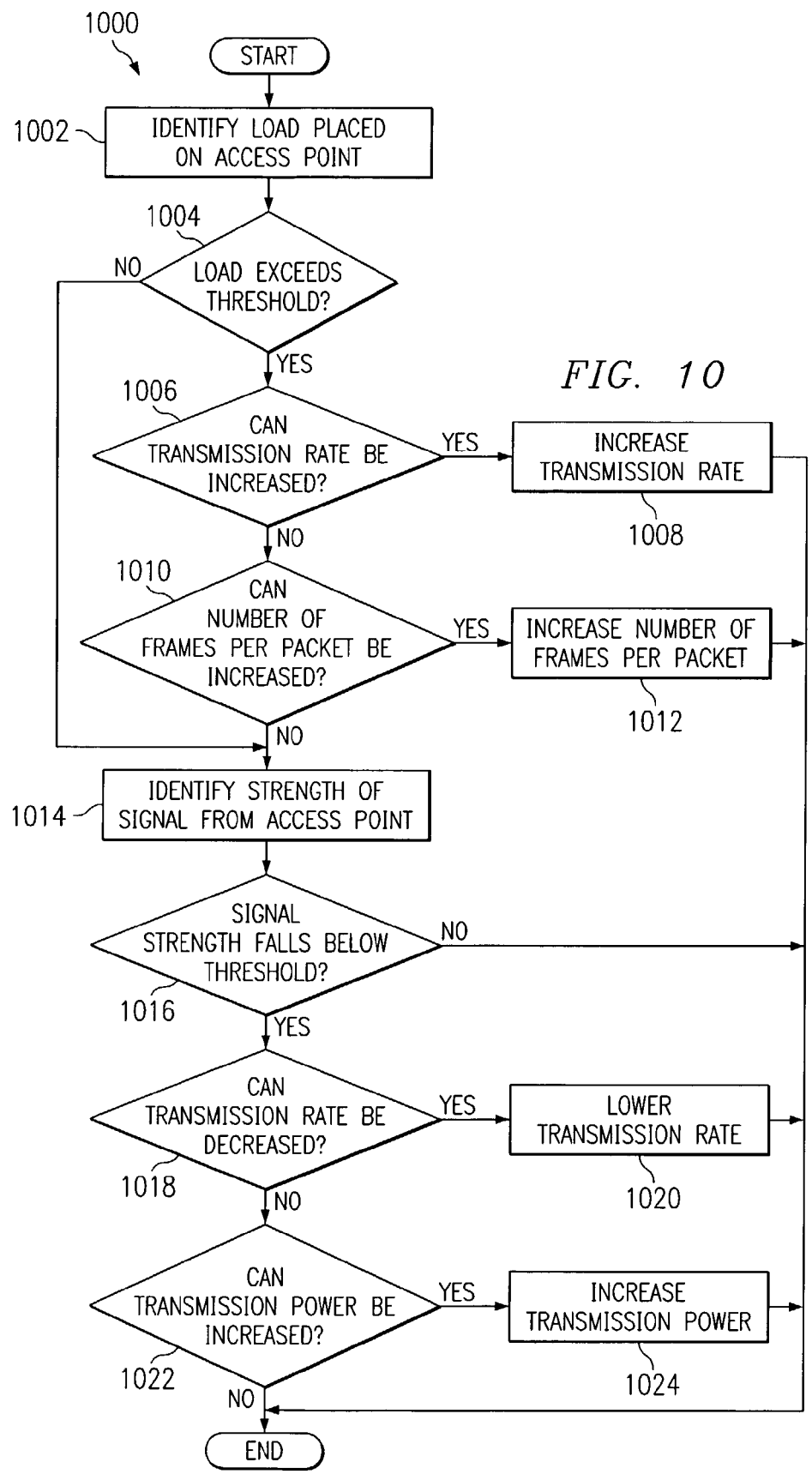
FIG. 10 illustrates an example method for adjusting operational parameters of a wireless device.

FIG. 10 illustrates an example method 1000 for adjusting operational parameters of a wireless device. While method 1000 may be described with respect to system 100 of FIG. 1, method 1000 could also be used by other systems.

Wireless device 110 identifies the load placed on a channel 112 at step 1002. This may include, for example, wireless device 110 receiving a signal from access point 102, such as a QBSS signal or any other signal identifying bandwidth load. This may also include wireless device 110 using the received signal to identify the load placed on channel 112.

Wireless device 110 determines whether the load exceeds a threshold at step 1004. This may include, for example, wireless device 110 determining whether the measured load exceeds a threshold 500 from FIG. 5A. If the load exceeds a threshold, wireless device 110 attempts to lessen the load on channel 112. Wireless device 110 determines whether its transmission rate can be reduced at step 1006. This may include, for example, wireless device 110 determining whether the current transmission rate is the highest possible transmission rate. If a higher transmission rate is available, wireless device 110 increases its transmission rate at step 1008. By increasing the transmission rate, wireless device 110 may reduce its utilization of communication channel 112, which may help to reduce the overall load placed on channel 112.

If the transmission rate cannot be increased, wireless device 110 determines whether it can increase the number of frames included in each packet or other datagram at step 1010. If possible, wireless device 110 increases the number of voice frames included in each packet or other datagram at step 1012. This may include, for example, wireless device 110 increasing the amount of time between the generation of new datagrams. This increases the amount of information contained in each datagram, which decreases the number of datagrams communicated from wireless device 110 to access point 102 and therefore the load placed on channel 112.

If the measured load does not exceed the threshold at step 1004 of if the wireless device 110 could not adjust its parameters to reduce the load, wireless device 110 identifies the strength of a signal received from access point 102 at step 1014. This may include, for example, wireless device 110 generating an RSSI value using the signal received from access point 102.

Wireless device 110 determines whether the measured signal strength falls below a threshold at step 1016. This may include, for example, wireless device 110 determining whether the measured signal strength falls below a threshold 550 from FIG. 5B. If the signal strength falls below a threshold, wireless device 110 attempts to compensate for the weaker signal strength. Wireless device 110 determines whether the transmission rate can be decreased at step 1018. This may include, for example, wireless device 110 determining whether the current transmission rate is the lowest possible transmission rate. If a lower transmission rate is available, wireless device 110 decreases its transmission rate at step 1020. By decreasing the transmission rate, wireless device 110 may increase the range at which it can communicate effectively with access point 102.

If the transmission rate cannot be decreased, wireless device 110 determines whether it can increase its transmission power at step 1022. This may include, for example, wireless device 110 determining whether the current transmission power is the highest possible transmission power. If a higher transmission power is available, wireless device 110 increases its transmission power at step 1024. By increasing the transmission power, wireless device 110 may also increase the range at which it can communicate effectively with access point 102.

If wireless device 110 reaches the end of method 1000 and has been unable to take steps to resolve problems with the load or signal strength, wireless device 110 could take any suitable action. For example, if wireless device 110 determines that the load placed on a channel 112 is too high but cannot take steps to reduce the load, wireless device 110 could jump to another channel 112.

Although FIG. 10 illustrates one example of a method 1000 for adjusting operational parameters of a wireless device, various changes may be made to method 1000. For example, wireless device 110 could test the signal strength before testing the load of channel 112. Also, the size of datagrams generated by wireless device 110 could affect the order in which the operational parameters are adjusted to correct problems with the load and signal strength. As a particular example, changes to the transmission rate may have a smaller effect on the load when wireless device 110 generates smaller datagrams. As a result, when wireless device 110 generates smaller datagrams, wireless device 110 could perform steps 1010-1012 before steps 1006-1008 and steps 1022-1024 before steps 1018-1020. In addition, other or additional characteristics could be monitored and used to adjust the operational parameters of wireless device 110.

In addition, a method similar to method 1000 can be used when the measured load falls below a threshold or when the measured signal strength exceeds a threshold. For example, when the load falls below a threshold, wireless device 110 could decrease its transmission rate or the number of packets per datagram. Also, when the signal strength increases above a threshold, wireless device 110 could increase its transmission rate or decrease its transmission power.

Figure 11:
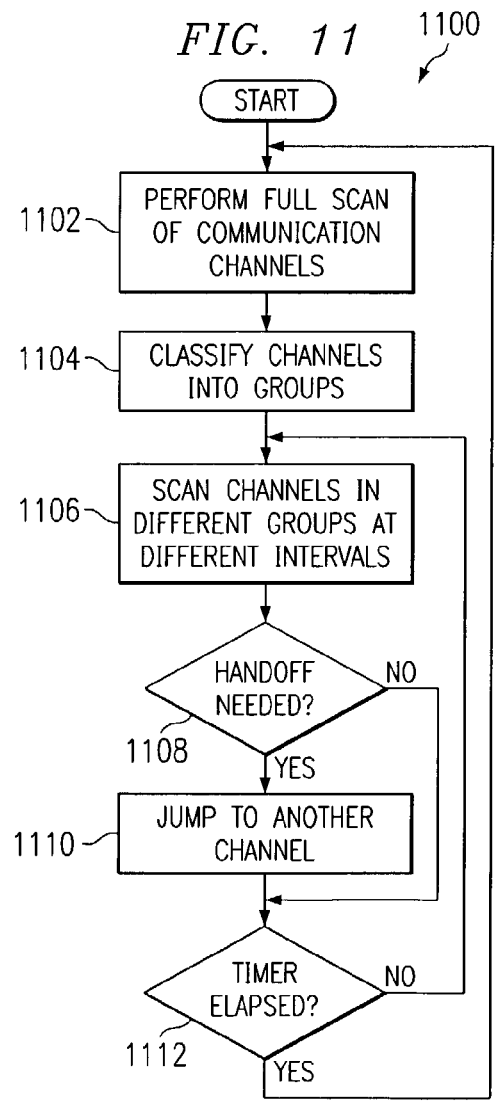
FIG. 11 illustrates an example method for supporting user mobility in a communication system.

FIG. 11 illustrates an example method 1100 for supporting user mobility in a communication system. While method 1100 may be described with respect to system 100 of FIG. 1, method 1100 could also be used by other systems.

Wireless device 110 performs a full scan of the communication channels 112 at step 1102. This may include, for example, wireless device 110 performing a passive scan and attempting to locate one or more beacons associated with one or more access points 102. This may also include wireless device 110 using the beacons to identify various characteristics associated with the channel 112, such as the load, signal strength, SSID, and authentication type. In a particular embodiment, multiple channels 112 and SSIDs may be used in system 100, and an active scan may occur for each channel-SSID combination.

Wireless device 110 classifies the channels 112 into groups at step 1104. This may include, for example, wireless device 110 placing a channel 112 using the same SSID and authentication type as the wireless device 110 into the "valid" channel group 702. This may also include wireless device 110 placing a channel 112 using a different SSID or authentication type than the wireless device 110 into the "incompatible" channel group 702.

Wireless device 110 scans the channels 112 in the different groups at different intervals at step 1106. This may include, for example, wireless device 110 scanning channels 112 at the intervals identified by scan frequencies 706 in table 700. This may also include wireless device 110 updating table 700 if a scan reveals that a channel 112 can be reclassified. This may further include wireless device 110 skipping the channels 112 listed in the first channel group 702 or all of the channels 112 when the signal strength of the current channel 112 exceeds a threshold. In a particular embodiment, wireless device 110 uses embedded loops to scan channels 112. For example, each channel group 702 could have an associated loop in the embedded loops, where the innermost loop corresponds to the first channel group 702 and the outermost loop corresponds to the last channel group 702. In this embodiment, wireless device 110 scans the first channel group 702 most often and the last channel group 702 least often.

In another particular embodiment, for the valid channel group 702, each channel 112 is actively scanned, and wireless device 110 waits to receive a response. If a response is received, wireless device 110 updates the information about that channel 112. If a response is not received, wireless device 110 moves the channel 112 to the overlap channel group 702 or the potential (non-overlap) channel group 702, depending on whether the channel 112 overlaps with the currently-used channel 112. For the potential channel group 702, each channel 112 is actively scanned. If a response is received, the channel 112 is moved to the valid channel group 702, and a decision is made whether to initiate a handoff to the new valid channel 112. Otherwise, the channel 112 remains in the potential channel group 702. Similarly, for the overlapping channel group 702, each channel 112 is actively scanned. If a response is received, the channel 112 is moved to the valid channel group 702, and a decision is made whether to initiate a handoff to the new valid channel 112. Otherwise, the channel 112 remains in the overlapping channel group 702.

Wireless device 110 determines whether a handoff is needed at step 1108. This may include, for example, wireless device 110 determining if a better channel 112 is available for use. If so, wireless device 110 jumps to the new channel 112 at step 1110. This may include, for example, wireless device 110 associating and authenticating with the access point 102 using the new channel 112.

Wireless device 110 determines whether a timer has elapsed at step 1112. The timer may identify when wireless device 110 should perform another full scan. If the timer has not elapsed, wireless device 110 returns to step 1106 to continue scanning channels 112 listed in table 700. Otherwise, a specified amount of time has elapsed since the last full scan, and wireless device 110 returns to step 1102 to perform another full scan.

Although FIG. 11 illustrates one example of a method 1100 for supporting user mobility in a communication system, various changes may be made to method 1100. For example, wireless device 110 could use other mechanisms for determining when to perform another full scan. As a particular example, wireless device 110 could count the number of times that each incompatible channel 112 is scanned and perform another full scan after the incompatible channels 112 have each been scanned twice. Also, various steps in method 1100 could be performed in parallel. As a particular example, wireless device 110 could perform steps 1108-1110 in parallel with step 1106.

FIG. 12 illustrates an example method 1200 for scanning a particular communication channel. While method 1200 may be described with respect to system 100 of FIG. 1, method 1200 could also be used by other systems.

Wireless device 110 determines if a call or other communication session is active at step 1202. The steps taken by wireless device 110 to scan a channel 112 may vary depending on whether an active communication session has been established.

If a communication session is active, wireless device 110 waits to receive a packet or other datagram at step 1204. Once a datagram is received, wireless device 110 places the access point 102 in sleep mode at step 1206. This may include, for example, wireless device 110 communicating a sleep command 852 to access point 102. Wireless device 110 begins queuing any packets or other datagrams to be communicated to the access point 102 at step 1208. This may include, for example, wireless device 110 storing the datagrams in an internal cache or other memory. Wireless device 110 scans a channel 112 at step 1210. When the scan is complete, wireless device 110 wakes access point 102 at step 1212. This may include, for example, wireless device 110 communicating a wake command 854 to access point 102. Wireless device 110 communicates any queued packets or other datagrams to access point 102 at step 1214. This may include, for example, wireless device 110 communicating the datagrams contained in the internal cache or other memory to access point 102. Wireless device 110 updates the list of channels contained in table 700 at step 1216. This may include, for example, wireless device 110 moving a channel 112 from one channel group 702 to another channel group 702.

If a communication session is not active at step 1202, wireless device 110 wakes from sleep mode at step 1218. This may include, for example, wireless device 110 setting an internal timer to match the interval of the beacon from its access point 102. This may also include wireless device 110 probing its access point 102 and adjusting its timer if wireless device 110 misses one or more beacons from its access point 102. Wireless device 110 places its access point 102 in sleep mode at step 1220. Wireless device 110 determines whether the interval between beacons on the channel 112 being scanned represents a relatively long period of time at step 1222. A channel 112 being scanned may have a relatively long beacon interval if its interval exceeds the beacon interval of the current channel 112 being used by wireless device 110. If the interval between beacons is relatively long, wireless device 110 actively probes the access point 102 supporting the scanned channel 112 at step 1224. This may include, for example, wireless device 110 communicating a message to access point 102. Wireless device 110 scans the channel 112 at step 1226, wakes the access point 102 at step 1228, and updates the channel list in table 700 at step 1230. Wireless device 110 then reenters sleep mode at step 1232. This may allow, for example, wireless device 110 to conserve battery power.

Although FIG. 12 illustrates one example of a method 1200 for scanning a particular communication channel, various changes may be made to method 1200. For example, wireless device 110 could perform the single set of steps to scan a channel 112, without regard to whether a communication session is active. Also, wireless device 110 is shown as placing the access point 102 in sleep mode before scanning a channel 112. In another embodiment, wireless device 110 could place the access point 102 in sleep mode only when the interval between incoming datagrams 802 is short. In yet another embodiment, wireless device 110 could scan a channel 112 without ever placing an access point 102 in sleep mode.

FIGS. 13A and 13B illustrate an example method 1300 for performing a handoff to support user mobility in a communication system. While method 1300 may be described with respect to system 100 of FIG. 1, method 1300 could also be used by other systems.

Wireless device 110 determines whether its handoff or roaming capability is enabled at step 1302. In one embodiment, wireless device 110 allows a user to deactivate the roaming feature. This may allow, for example, a technician to deactivate the roaming feature and test the range of an access point 102. This may also allow a user to limit the areas in which the wireless device 110 can be used. If the handoff or roaming feature is disabled, a handoff may not occur, and method 1300 ends.

Wireless device 110 determines whether the signal strength of the current channel 112 exceeds a threshold at step 1302. If so, the current channel 112 used by wireless device 110 has a strong signal strength, and no handoff is needed. As a result, method 1300 again ends. Otherwise, wireless device 110 compares the load associated with the next channel 112 to a threshold at step 1306. If the load exceeds the threshold, method 1300 ends. In this case, the load on the next channel 112 is too high, and a handoff is not initiated.

Wireless device 110 compares the signal strength of the current channel 112 to the signal strength of the next channel 112 at step 1308. If the signal strength of the current channel 112 is less than the signal strength of the next channel 112 by a specified amount, wireless device 110 skips to step 1312 and attempts a handoff to the next channel 112. In this case, the quality of the next channel 112 may justify performing a handoff. As a particular example, wireless device 110 may attempt a handoff when the signal strength of the current channel 112 is at least twenty percent less than the signal strength of the next channel 112, although any other suitable value could be used.

Wireless device 110 also compares the load of the next channel 112 to the load of the current channel 112 at step 1310. If the load of the next channel 112 is less than the load of the current channel 112 by a specified amount, wireless device 110 again skips to step 1312 and attempts a handoff to the next channel 112. As a particular example, wireless device 110 may attempt a handoff when the load of the next channel 112 is at least twenty percent less than the load of the current channel 112, although other values could be used. If both the signal strength and the load of the current channel 112 are not less than the signal strength and the load of the next channel 112 by the specified amounts, method 1300 ends. In this case, the next channel 112 does not have characteristics that justify performing a handoff to the next channel 112.

If a handoff is justified, wireless device 110 determines whether the next channel 112 has been scanned for a specified amount of time at step 1312. This may include, for example, wireless device 110 determining whether the next channel 112 has been scanned within the past minute. If not, wireless device 110 scans the next channel 112 at step 1314. This may allow, for example, wireless device 110 to determine whether the quality of the next channel 112 has decreased since its last scan. Wireless device 110 determines whether the next channel 112 is still acceptable at step 1316. This may include, for example, wireless device 110 determining whether the next channel 110 still resides in the "valid" channel group 702 and has a suitable signal strength and load. If not acceptable, method 1300 ends.

If the next channel 112 has been scanned more recently at step 1312 or is acceptable at step 1316, wireless device 110 attempts a handoff at step 1318. This may include, for example, wireless device 110 attempting to associate and authenticate with the access point 102 supporting the next channel 112. Wireless device 110 determines if the handoff was successful at step 1320. If successful, wireless device 110 begins communicating over the next channel 112 at step 1322. Wireless device 110 also sets a timer at step 1324. While the timer is still active, wireless device 110 may not initiate another handoff, unless a handoff is required to maintain service (such as when the current access point 102 suffers a power loss). This may help to reduce or prevent a wireless device 110 from making multiple handoffs within a short amount of time, which could degrade service. Wireless device 110 also updates its channel list in table 700 at step 1326. This may include, for example, wireless device 110 removing the channel to which the wireless device 110 jumped from table 700.

If the handoff was not successful at step 1320, wireless device 110 attempts to reestablish a connection with the original access point 102 at step 1328. This may include, for example, wireless device 110 trying to associate and authenticate with the original access point 102. Wireless device 110 determines whether it was able to reestablish a connection with the original access point 102 at step 1330. If successful, method 1300 ends. Wireless device 110 has attempted a handoff and failed. Wireless device 110 may then take any suitable action, such as recording that the wireless device 110 failed to jump to the next channel 112. Otherwise, the attempted reestablishment failed at step 1330, and wireless device 110 performs a quick scan at step 1332. This may include, for example, wireless device 110 using table 700 and attempting to locate any suitable communication channel 112. If no channels 112 are found in table 700, wireless device 110 may scan for a suitable channel 112. In a particular embodiment, wireless device 110 may perform an active scan for a suitable channel 112 if a communication session is active at wireless device 110 and a passive scan if wireless device 110 is in idle mode. Wireless device 110 then attempts to jump to the access point 102 that uses the identified channel 112.

Although FIGS. 13A and 13B illustrate one example of a method 1300 for performing a handoff to support user mobility in a communication system, various changes may be made to method 1300. For example, wireless device 110 may not allow a user to deactivate the roaming feature, and step 1302 need not be performed. Also, the signal strength and channel load can be tested in any suitable order. Further, wireless device 110 could attempt a handoff without checking whether the next channel 110 has been recently scanned. Beyond that, other methods can be used to determine whether a wireless device 110 should jump to a different channel 112.

In addition, FIGS. 13A and 13B illustrate the mechanism that wireless device 110 may use when making a "soft" handoff decision. This type of handoff decision occurs when the wireless device 110 is still receiving service from its current access point 102. In a "hard" handoff decision, wireless device 110 may have lost use if its current channel 112. This may occur, for example, when wireless device 110 fails to receive three datagrams in a row from access point 102 during a call or when wireless device 110 fails to receive three beacons from its access point 102 while in idle mode. In that case, wireless device 110 could decide that it has lost the current channel 112. Wireless device 110 may use table 700 to identify any channel 112 that could be used. If none are found in table 700, wireless device 110 may perform a quick scan and attempt to locate any usable channel 112.

This specification has described wireless device 110 as performing both a channel enhancement function and a scanning/roaming function. However, wireless device 110 could perform the channel enhancement function without having the ability to perform the scanning/roaming function. Similarly, wireless device 110 could perform the scanning/roaming function without having the ability to perform the channel enhancement function.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   establishing a communication session at a wireless device;
   monitoring at least one characteristic associated with the communication session; and
   adjusting at least one operational parameter of the wireless device based on the at least one monitored characteristic, wherein adjusting the at least one operational parameter comprises increasing at least one of a transmission rate and a number of voice frames in datagrams generated by the wireless device.

2. The method of claim 1, wherein monitoring the at least one characteristic comprises monitoring at least one of a load on a communication channel used by the wireless device and a strength of a signal received from an access point serving the wireless device.

3. The method of claim 1, wherein increasing the transmission rate and the number of voice frames in datagrams generated by the wireless device comprises:
   determining if a load on a communication channel used by the wireless device exceeds a threshold; and
   increasing the transmission rate and the number of voice frames in datagrams generated by the wireless device when the load exceeds the threshold.

4. The method of claim 3, wherein increasing the transmission rate and the number of voice frames in the datagrams comprises:
   identifying a size of the datagrams;
   increasing the transmission rate before increase the number of voice frames when the datagram size exceeds a specified size; and
   increasing the number of voice frames before increase the transmission rate when the datagram size falls below the specified size.

5. The method of claim 1, wherein adjusting the at least one operational parameter comprises:
   determining if a strength of a signal received from an access point serving the wireless device falls below a threshold; and
   at least one of decreasing a transmission rate and increasing a transmission power when the signal strength falls below the threshold.

6. The method of claim 1, wherein adjusting the at least one operational parameter comprises:
   accessing a table, the table comprising a plurality of entries, each entry associated with a range of possible values for each of the at least one monitored characteristic, each entry also associated with a specified value for the at least one operational parameter;
   selecting one of the entries using the at least one monitored characteristic; and
   adjusting the at least one operational parameter when the specified value for the at least one operational parameter in the selected entry differs from a current value for the at least one operational parameter.

7. The method of claim 1, further comprising selecting a lowest transmission rate and a lowest transmission power for use by the wireless device before establishment of the communication session.

8. The method of claim 1, wherein the communication session comprises a telephone call.

9. Logic embodied on at least one computer readable medium and operable when executed on a processor, to:
 establish a communication session at a wireless device;
 monitor at least one characteristic associated with a communication session at a wireless device; and
 adjust at least one operational parameter of the wireless device based on the at least one monitored characteristic, wherein the logic is operable to adjust the at least one operational parameter by increasing at least one of a transmission rate and a number of voice frames in datagrams generated by the wireless device.

10. The logic of claim 9, wherein the logic is operable to monitor the at least one characteristic by monitoring at least one of a load on a communication channel used by the wireless device and a strength of a signal received from an access point serving the wireless device.

11. The logic of claim 9, wherein the logic is operable to increase the transmission rate and the number of voice frames in datagrams generated by the wireless device by:
 determining if a load on a communication channel used by the wireless device exceeds a threshold; and
 increasing the transmission rate the number of voice frames in datagrams generated by the wireless device when the load exceeds the threshold.

12. The logic of claim 11, wherein the logic is operable to increase the number of voice frames in the datagrams by:
 identifying a size of the datagrams;
 increasing the transmission rate before increase the number of voice frames when the datagram size exceeds a specified size; and
 increasing the number of voice frames before increase the transmission rate when the datagram size falls below the specified size.

13. The logic of claim 9, wherein the logic is operable to adjust the at least one operational parameter by:
 determining if a strength of a signal received from an access point serving the wireless device falls below a threshold; and
 at least one of decreasing a transmission rate and increasing a transmission power when the signal strength falls below the threshold.

14. The logic of claim 9, wherein the logic is operable to adjust the at least one operational parameter by:
 accessing a table, the table comprising a plurality of entries, each entry associated with a range of possible values for each of the at least one monitored characteristic, each entry also associated with a specified value for the at least one operational parameter;
 selecting one of the entries using the at least one monitored characteristic; and
 adjusting the at least one operational parameter when the specified value for the at least one operational parameter in the selected entry differs from a current value for the at least one operational parameter.

15. The logic of claim 9, wherein the logic is further operable to select a lowest transmission rate and a lowest transmission power for use by the wireless device before establishment of the communication session.

16. An apparatus, comprising:
 a processor operable to:
 monitor at least one characteristic associated with a communication session at a wireless device; and
 adjust at least one operational parameter of the wireless device based on the at least one monitored characteristic, wherein the processor is operable to adjust the at least one operational parameter by increasing at least one of a transmission rate and a number of voice frames in datagrams generated by the wireless device; and
 a memory operable to store a plurality of thresholds used by the processor to adjust the at least one operational parameter.

17. The apparatus of claim 16, wherein the processor is operable to monitor the at least one characteristic by monitoring at least one of a load on a communication channel used by the wireless device and a strength of a signal received from an access point serving the wireless device.

18. The apparatus of claim 16, wherein the processor is operable to increase the transmission rate and the number of voice frames in datagrams generated by the wireless device by:
 determining if a load on a communication channel used by the wireless device exceeds a threshold; and
 increasing the transmission rate and the number of voice frames in datagrams generated by the wireless device when the load exceeds the threshold.

19. The apparatus of claim 18, wherein the processor is operable to increase the number of voice frames in the datagrams by:
 identifying a size of the datagrams;
 increasing the transmission rate before increase the number of voice frames when the datagram size exceeds a specified size; and
 increasing the number of voice frames before increase the transmission rate when the datagram size falls below the specified size.

20. The apparatus of claim 16, wherein the processor is operable to adjust the at least one operational parameter by:
 determining if a strength of a signal received from an access point serving the wireless device falls below at least one of the thresholds; and
 at least one of decreasing a transmission rate and increasing a transmission power when the signal strength falls below the at least one threshold.

21. The apparatus of claim 16, wherein the plurality of thresholds form a table comprising a plurality of entries, each entry associated with a range of possible values for each of the at least one monitored characteristic, each range defined by a maximum threshold and a minimum threshold, each entry also associated with a specified value for the at least one operational parameter; and
 the processor is operable to adjust the at least one operational parameter by:
 selecting one of the entries using the at least one monitored characteristic; and
 adjusting the at least one operational parameter when the specified value for the at least one operational parameter in the selected entry differs from a current value for the at least one operational parameter.

22. The apparatus of claim 16, wherein the processor is further operable to select a lowest transmission rate and a lowest transmission power for use by the wireless device before establishment of the communication session.

23. The apparatus of claim 16, wherein the processor and memory form part of a wireless device.

24. The apparatus of claim 23, wherein the wireless device further comprises:

a display operable to present information to a user; and
a plurality of keys operable to by selected by the user.

25. A system, comprising:
means for establishing a communication session at a wireless device;
means for monitoring at least one characteristic associated with the communication session; and
means for adjusting at least one operational parameter of the wireless device based on the at least one monitored characteristic, wherein adjusting the at least one operational parameter comprises increasing at least one of a transmission rate and a number of voice frames in datagrams generated by the wireless device.

* * * * *